United States Patent Office 2,788,350
Patented Apr. 9, 1957

2,788,350

PRODUCTION OF ALKYLENE CHLOROHYDRINS

Paul G. Lafyatis, Cleveland, Ohio, and Joel A. Zaslowsky, Niagara Falls, N. Y., assignors to Olin Mathieson Chemical Corporation, a corporation of Virginia No Drawing. Application October 22, 1953,
Serial No. 387,798

4 Claims. (Cl. 260—338)

Our invention relates to the production of anhydrous alkylene chlorohydrins and other useful products from certain polychlorinated dialkyl ethers, advantageously obtained from beta, beta'-dichlorodialkyl ethers. The latter are formed as by-products in the manufacture of alkylene chlorohydrins by the aqueous chlorination of olefins.

The aqueous chlorination of olefins may be accomplished at feasible rates with ethylene and propylene. The higher olefins react more slowly and their chlorohydrination is of less practical interest. In the aqueous chlorination of ethylene by the introduction of both gases into a body of water, ethylene chlorohydrin is formed as a principal product but usually the reaction cannot be carried beyond a concentration of about 8 to 12 percent of ethylene chlorohydrin in water due to the increased and uneconomical formation of by-products. Ethylene dichloride and beta, beta'-dichlorodiethyl ether are the principal by-products formed. Ordinarily it is desirable to suppress the formation of these by-products but they cannot be completely avoided. For this reason, uses for the ethylene dichloride and beta, beta'-dichlorodiethyl ether by-products have been widely sought. Appreciable quantities of the latter have been used for the extraction of lubricating oils and other petroleum fractions but in this use the solvent is always recycled and make-up requirements are low. For this reason beta, beta'-dichlorodiethyl ether is a material of very low economic valve and its conversion to more useful materials would be desirable.

In the recovery of the dilute ethylene chlorohydrin formed in the above synthesis reaction, it is common practice to produce a 40 percent solution by concentration of the reaction solution. For many purposes, however, anhydrous ethylene chlorohydrin is desirable in organic syntheses. Its preparation by dehydration of the 40 percent solution is difficult and the cost of anhydrous ethylene chlorohydrin is considerably more than that of the aqueous solution.

We have now found that alkylene chlorohydrins are obtained in good yields and in anhydrous form from certain polychlorinated dialkyl ethers which are obtained advantageously by the chlorination of the by-product beta, beta'-dichlorodialkyl ethers formed in the aqueous chlorohydrination of olefins. The polychlorinated dialkyl ethers have the formula:

$$ClCH_2CHR_4-O-CR_1ClCH_{3-n}Cl_n$$

in which $R_1$ and $R_4$ are either H or $CH_3$ and $n$ varies from 1 to 3. The process of our invention comprises the reaction of the polychlorinated dialkyl ethers with an alkylene glycol at a temperature within the range of 80 to 150° C. The products of the reaction are an anhydrous alkylene chlorohydrin and a chloromethyl-O-heterocyclic of the formula:

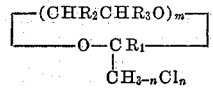

in which $R_1$ is hydrogen or methyl, $R_2$ is hydrogen or methyl and $R_3$ is hydrogen, methyl or ethyl, $m$ is 1 or 2 and $n$ varies from 1 to 3.

The polychlorinated dialkyl ethers are advantageously obtained by the chlorination of the beta, beta'-dichlorodialkyl ethers from the aqueous chlorination of olefins. Suitably, they contain only 1 alpha chlorine atom, only 1 beta' chlorine atom and from 1 to 3 beta chlorine atoms. For example, a useful ether is the alpha, beta, beta'-trichlorodiethyl ether produced by the chlorination of beta, beta'-dichlorodiethyl ether at a temperature within the range of about 10 to 50° C. as described in pending application Serial No. 330,351, filed January 8, 1953 of Bruno H. Wojcik. Thus, the polychlorinated dialkyl ethers suitable for use according to our invention are advantageously obtained by the chlorination of the by-product beta, beta'-dichlorodiethyl ether from the aqueous chlorination of ethylene or by the chlorination of the dichlorodipropyl ether from the aqueous chlorination of propylene. Higher chlorinated products of beta, beta'-dichlorodiethyl ether such as tetra- and pentachlorodiethyl ethers are also useful. Many known polychlorodiethyl ethers having one ethyl group free from chlorine, for example, $CCl_3CHClOCH_2CH_3$, are not suitable for formation of anhydrous alkylene chlorohydrins.

The useful alkylene glycols for our invention include ethylene glycol, diethylene glycol, propylene glycol, butylene glycol and the like.

The nature of the reaction products depends on the starting materials but the chlorohydrin obtained depends only on the nature of the $R_4$ group of the chloro-ether and is not affected by the nature of the glycol used as reactant. Thus, ethylene chlorohydrin results when $R_4$ is hydrogen and propylene chlorohydrin results when $R_4$ is methyl. In the reaction the glycol contributes only a hydrogen atom to form the chlorohydrin.

The structure of the resulting chloromethyl-O-heterocyclic compound depends both on the nature of the glycol used and on the structure of the ether. Thus, the nature of $R_1$ and the value of $n$ in the ether determine the corresponding characters in the O-heterocyclic. The nature of the glycol used determines the remaining structure of the O-heterocyclic, $R_2$ being either hydrogen or methyl and $R_3$ being hydrogen, methyl or ethyl, according to whether ethylene glycol, propylene glycol or butylene glycol is used. The value of $m$ in the O-heterocyclic depends on the corresponding value of $m$ when polyglycols are used.

When ethylene glycol and alpha, beta, beta'-trichlorodiethyl ether are used, the reaction appears to proceed according to the following equation to produce ethylene chlorohydrin and 2-chloromethyl-1,3-dioxolane:

$$ClCH_2CH_2OCHClCH_2Cl + HOCH_2CH_2OH \longrightarrow$$

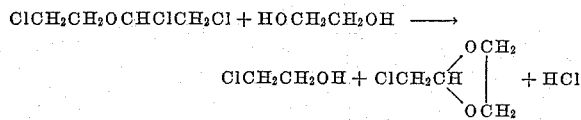

When propylene glycol is used to react with alpha, beta, beta'-trichlorodiethyl ether, ethylene chlorohydrin and 2-chloro-methyl-4-methyl dioxolane are the resulting products. When diethylene glycol is used the products are ethylene chlorohydrin and 2-chloromethyl-1,3,6-trioxocane. When tetra- and pentachlorodiethyl ethers of the formula given above react with ethylene glycol, dichloro- and trichloromethyl dioxolanes are formed together with ethylene chlorohydrin.

Our invention thus provides a simplified process for the production of anhydrous alkylene chlorohydrins utilizing by-products of low economic value. According to our process, half of the olefin which entered into the formation of the by-product dichlorodialkyl ether in the aqueous chlorination process is converted to anhydrous chlorohydrin. Moreover, chloromethyl-O-heterocyclics are also produced which are particularly useful materials. For example, 2-chloromethyldioxolane may be used in many reactions as a substitute for monochloroacetaldehyde. Monochloroacetaldehyde is a difficult material to obtain and, therefore, this co-product has substantial utility as a substitute.

The reaction is carried out by heating the reactants at a temperature within the range of about 80 to 150° C. Advantageously an excess of glycol is used and the molar proportion of glycol to ether may vary from about 1:1 to 2:1. The products are recovered by distillation. At more elevated temperatures the chloroethers may be decomposed to produce products other than the desired ones. The reaction temperature may be controlled by refluxing the mixture under reduced pressure and the alkylene chlorohydrin may thus be removed as formed at about 80 to 150° C. For example, ethylene chlorohydrin boils at 91.8 at 200 mm. pressure. Alternatively, the reaction mixture may be heated on a boiling water bath and subsequently distilled. Inert solvents having boiling ranges within the temperature limits of the reaction may also be used to control the reaction temperature and to remove anhydrous alkylene chlorohydrin from the mixture. Toluene is particularly suitable as an inert reaction medium. An excess of toluene is originally or continuously introduced into the reaction and the temperature maintained at the boiling point of toluene. An azeotrope of toluene and anhydrous ethylene chlorohydrin is removed by distillation and the chloromethyl-O-heterocyclic is recovered from the residue. Other inert solvents which may be used include benzene and petroleum ether.

The reaction may be carried out without the aid of a catalyst. The use of acid catalysts, however, is advantageous as the reaction time is thus reduced. Aqueous hydrochloric acid may be used but then the alkylene chlorohydrin is not formed in anhydrous conditions. It is preferable to add dry hydrogen chloride gas for this reason. More advantageously, however, an acidic ion exchange resin is used as catalyst since it can readily be separated from the organic reaction products and introduces no extraneous materials. Suitable acidic ion exchange resins useful as catalysts for the reaction include, for example, the resin derived from sulfonated coal such as "Zeo-Karb," the sulfonated phenolformaldehyde resins such as "Amberlite IR-120" and "Duolite" and sulfonated polystyrene type resins such as "Dowex 50." These resins are very stable and appear to be able to convert an unlimited quantity of reactants.

The process of our invention will be further illustrated by reference to the following examples.

*Example I*

A mixture of 88.5 grams (0.5 mole) of alpha, beta, beta'-trichlorodiethyl ether, 46.5 grams (0.75 mole) of ethylene glycol, 250 ml. of toluene and 15 grams "Amberlite IR-120" resin was distilled through a Hempel column packed with glass helices. Extensive distillation occurred at 105 to 106° C., the boiling point of the toluene-ethylene chlorohydrin azeotrope containing about 25 percent of the latter. The heating was continued until a pot temperature of 140° C. was reached. The reaction mixture was filtered to remove resin, washed with water and dried over sodium sulfate. Atmospheric distillation gave 49 grams of product having a boiling point of 156 to 162° C. and representing an 80 percent conversion of the trichlorodiethyl ether charged.

*Example II*

A mixture of 8.9 pounds (0.05 pound-mole) of alpha, beta, beta'-trichlorodiethyl ether, 3.1 pounds (0.05 pound-mole) of ethylene glycol, 50 grams of "Zeo-Karb H" resin and 1 gallon of toluene was distilled through a Hempel column packed with glass helices. The azeotrope of ethylene chlorohydrin and toluene was removed overhead and distillation was continued to a vapor temperature of 150° C. Chloromethyldioxolane was obtained at vapor temperatures of 150 to 160° C.

*Example III*

A mixture of 31 grams (0.5 mole) of ethylene glycol, 89 grams (0.5 mole) of alpha, beta, beta'-trichlorodiethyl ether and 10 grams of "Amberlite IR-120" resin was refluxed under pressure of 200 mm. Hg absolute. Anhydrous ethylene chlorohydrin was removed to a vapor temperature of 95° C. and chloromethyldioxolane at 100° to 140° C. A conversion to the latter of 107 grams or 87 percent was obtained.

*Example IV*

A mixture of 31 grams (0.5 mole) of ethylene glycol, 89 grams (0.5 mole) of alpha, beta, beta'-trichlorodiethyl ether and 100 ml. of toluene was distilled as described in preceding examples. After removal of the ethylene chlorohydrintoluene azeotrope, 58 grams (95 percent) of chloromethyldioxolane was obtained.

*Example V*

A mixture of 106 grams (0.5 mole) of alpha, beta, beta, beta'-tetrachlorodiethyl ether, 46 grams (0.75 mole) of ethylene glycol, 15 grams of "Amberlite IR-120" resin and 250 milliliters of toluene was refluxed for about 12 hours. It was then distilled to a pot temperature of 200° C. and a vapor temperature of 130° C. to remove toluene and ethylene chlorohydrin. The residue was vacuum distilled at 25 mm., collecting 48 grams of dichloromethyldioxolane at 90 to 100° C. Yield was 61 percent.

*Example VI*

A mixture of 53 grams (0.5 mole) of diethylene glycol, 89 grams (0.5 mole) of alpha, beta, beta'-trichloroethyl ether and 200 ml. of benzene was refluxed for 9 hours. Benzene and ethylene chlorohydrin were first removed by distillation at atmospheric pressure and the residue was vacuum distilled. The portion boiling at 152 to 160/1 mm. was 2-chloromethyl-1, 3,6-trioxocane obtained in 30 percent yield. The analysis was:

|     | Calc., percent | Found, percent |
| --- | --- | --- |
| C   | 43.2 | 43.0 |
| H   | 6.6  | 6.8  |
| Cl  | 21.2 | 22.9; 20.7 |

It had a melting point of 45 to 46° C. and a molecular weight of 158 to 160 (calculated, 166.5).

*Example VII*

A mixture of 424 grams (4 moles) of diethylene glycol and 710 grams (4 moles) of alpha, beta, beta'-trichloroethyl ether and 200 ml. of benzene was refluxed for nine hours. Benzene and ethylene chlorohydrin were removed by distillation at atmospheric pressure and the residue was distilled at reduced pressure. Fractions boiling between 100 and 160° C. at 5 mm. appear to include substantially all of the chloromethyltrioxocane. The product boiling in this range amounted to 460.7 grams corresponding to a yield of 70 percent.

*Example VIII*

A mixture of 8.85 pounds (0.05 pound-mole) of alpha, beta, beta'-trichloroethyl ether, 5.3 pounds (0.05 pound-mole) of diethylene glycol and one liter of benzene were refluxed for 20 hours. Benzene and ethylene chlorohydrin were distilled out and the residue was distilled under reduced pressure. Material boiling at 132 to 167° C. at 20 mm. and amounting to 4.89 pounds was collected as chloromethyltrioxocane product. This represents a yield of about 58 percent.

We claim:

1. A process for the production of alkylene chlorohydrins and chlorine-bearing O-heterocyclics which comprises reacting a polychlorinated dialkyl ether of the formula:

$$ClCH_2CHR_4—O—CR_1ClCH_{3-n}Cl_n$$

in which $R_1$ and $R_4$ are selected from the group consisting of hydrogen and methyl groups and in which $n$ varies from 1 to 3, with a lower alkylene glycol at a temperature within the range of about 80 to 150° C.

2. A process for the production of alkylene chlorohydrins and chlorine-bearing O-heterocyclics which comprises reacting a polychlorinated dialkyl ether of the formula:

$$ClCH_2CHR_4—O—CR_1ClCH_{3-n}Cl_n$$

in which $R_1$ and $R_4$ are selected from the group consisting of hydrogen and methyl groups and in which $n$ varies from 1 to 3, with ethylene glycol at a temperature within the range of about 80 to 150° C.

3. A process for the production of ethylene chlorohydrin and chlorine-bearing 2-methyldioxolanes which comprises reacting a polychlorinated diethyl ether of the formula:

$$ClCH_2CH_2—O—CHClCH_{3-n}Cl_n$$

in which $n$ varies from 1 to 3, with ethylene glycol at a temperature within the range of about 80 to 150° C.

4. A process for the production of ethylene chlorohydrin and chlorine-bearing 2-methyldioxolanes which comprises reacting a polychlorinated diethyl ether of the formula:

$$ClCH_2CH_2—O—CHClCH_{3-n}Cl_n$$

in which $n$ varies from 1 to 3, with ethylene glycol at a temperature within the range of about 80 to 150° C. in the presence of an inert solvent and an acidic ion exchange resin as a catalyst.

References Cited in the file of this patent

UNITED STATES PATENTS

| | | |
|---|---|---|
| 2,428,805 | Kharasch | Oct. 14, 1947 |
| 2,532,340 | Schroeder | Dec. 5, 1950 |

OTHER REFERENCES

Hibbert et al.: J. A. C. S. 51, 1551–4 (1929).